United States Patent [19]

McNew

[11] 4,365,733

[45] Dec. 28, 1982

[54] SYSTEM FOR PASSING ELONGATED PAPER THROUGH A REPRODUCING APPARATUS

[76] Inventor: Thomas A. McNew, P.O. Box 82432, Oklahoma City, Okla. 73148

[21] Appl. No.: 261,583

[22] Filed: May 7, 1981

[51] Int. Cl.³ ...................... B65H 17/42; G03B 27/58

[52] U.S. Cl. ...................................... 226/109; 355/72

[58] Field of Search .................... 242/76, 129.5, 129.6; 226/109, 110, 196; 355/3 SH, 72-75; 271/207, 242; 220/22, 22.3; 211/49 D, 49 S, 126

[56] References Cited

U.S. PATENT DOCUMENTS

| | | | |
|---|---|---|---|
| 2,257,536 | 9/1941 | Roycroft | 220/22.3 |
| 4,087,178 | 5/1978 | Pfeifer et al. | 355/72 |
| 4,155,643 | 5/1979 | Ladds et al. | 355/72 |
| 4,185,760 | 1/1980 | McNew | 226/109 |

*Primary Examiner*—Leonard D. Christian
*Attorney, Agent, or Firm*—William R. Laney

[57] ABSTRACT

A system for passing long fan-folded documents and corresponding copy paper through a reproducing apparatus either concurrently or independently of each other, and including a collapsible, upright stand which carries a pair of paper roll supporting elements, a pair of paper guide plates pivotally and detachably connected to the top of the stand, and a guide bar for guiding paper from a roll on the stand to the guide plates. The system further includes a feed tray detachably mounted on a reproducing apparatus and having a partition plate selectively positionable in the feed tray to facilitate containment in the tray of a fan-folded document to be reproduced. The feed tray includes a bottom plate having downwardly projecting ribs to detachably mount the tray on the reproducing machine, and upwardly projecting ribs spaced from a paper discharge slot at the front side of the tray, and acting as an indexing abutment for contacting and positioning the fan-folded document in the tray.

A document collection tray is detachably mountable on the reproducing machine for receiving the fan-folded document after passage through the reproducing machine, and deflecting them into a stacked fan-folded configuration.

41 Claims, 16 Drawing Figures

SYSTEM FOR PASSING ELONGATED PAPER THROUGH A REPRODUCING APPARATUS

BACKGROUND OF THE INVENTION

1. Field of the Invention

This invention relates to ancillary or accessory equipment used in conjunction with copying or reproducing machines for feeding and receiving papers which are passed through such machines for purposes of producing copies. More specifically, but not by way of limitation, the invention relates to apparatus for feeding elongated fan-folded papers, both original documents and copy paper, to a xerographic reproducing machine, and for receiving such papers in a fashion to facilitate convenient further use and storage.

2. Brief Description of the Prior Art

In my U.S. Pat. No. 4,185,760 entitled "SYSTEM FOR FEEDING ELONGATED DOCUMENTS TO REPRODUCING APPARATUS" filed on May 22, 1978, and issued Jan. 29, 1980, I describe a system by means of which elongated, relatively narrow sheets of copy paper may conveniently be fed to a xerographic copying machine in synchronization with the feeding to the machine of an elongated fan-fold type original document. This system satisfied a need in enabling the conventional xerographic copying apparatus to be utilized for producing continuous, elongated copies of such similarly elongated original documents as galley proofs of manuscripts, oil and gas well logs, electrocardiograms, teletype printouts, strip charts made on various types of continuous recorders, adding machine tapes, computer printouts, the output of graphic plotters and seismic data, and the like.

The apparatus described in my previously issued patent comprises a collapsible, vertically extending A-frame which includes a pair of opposed, vertically extending divergent sides pivotally connected to each other at their upper ends and having their lower ends horizontally spaced from each other. The two sides of the A-frame carry paper roll supporting elements upon which active and standby rolls of elongated copy paper can be supported for selective feeding to the xerographic copying machine. The A-frame further carries at its upper end, and provides support for, a feed tray which has one end detachably engaged with the upper side of the A-frame and the other end supported adjacent a paper feeding mechanism constituting a subassembly conventionally included in such reproducing or copying apparatus.

While the feeding system described in my U.S. Pat. No. 4,185,760 has worked well in practice, I have now improved that system in several respects. I have made a more compact supporting stand for supporting and feeding elongated copy paper from rolls carried on the stand, and I have improved the paper feed tray employed for feeding the fan-folded original documents to the reproducing machine at a location above the point of feed of the copy paper. The stand employed can be quickly and easily set up adjacent the copying machine, and when not in use can be folded compactly into a relatively small volume. The feed tray employed for feeding the fan-folded original documents to the copying machine is selectively positionable to facilitate feeding fan-folded documents of various widths in a trouble-free fashion. The present system further includes a document collection tray which is constructed to facilitate quick attachment to a conventional xerographic copying machine, and when so attached, to automatically deflect fan-folded original documents passing out of the machine into a stacked fan-folded configuration.

BRIEF DESCRIPTION OF THE PRESENT INVENTION

Broadly described, the system for passing elongated paper through a reproducing apparatus as constructed in accordance with the present invention includes three subassemblies. The first of these is the copy roll supporting subassembly which functions to support a plurality of rolls of elongated copy paper and position this paper for optimum feeding to a reproducing or copying machine. A second important subassembly is the feed tray, which is especially constructed to facilitate mounting on the copying machine, and for containment of one or a plurality of fan-folded elongated documents supported in a fan-folded stack within the tray, and fed therefrom to the copying machine. The third subassembly is a document collection tray which is detachably connected to the copying machine and positioned at a location to intercept the fan-folded original documents after they have been passed through the copying machine. The document collection tray is constructed to deflect the discharging fan-folded documents in a pattern which automatically refolds the documents and stacks them in a fan-fold configuration at the point of discharge from the machine.

The copy roll supporting subassembly more specifically includes a collapsible upright stand which carries a pair of copy paper roll supporting elements vertically spaced from each other and detachably mounted in the stand for supporting a plurality of copy paper rolls, either in a standby or active position, preparatory to feeding copy paper to the copying machine. The roll supporting subassembly further includes a pair of substantially parallel paper guide plates which are pivotally and detachably connected to the top of the stand, and which function to guide and support the elongated copy paper as it passes from a feed roll into the copying machine. The stand is collapsible so that it can be folded into a compact position for transport and storage when not in use.

The feed tray is of generally rectangular parallelepiped configuration and includes a bottom plate which has indexing ribs projecting from the lower side thereof to facilitate detachable securement of the feed tray to the upper side of a copying machine while it is in use. Stop ribs also project upwardly from the upper side of the bottom plate of the feed tray and serve to index and arrest movement of the forward edge of a stacked, fan-folded original document. At the intersection of a front wall and the bottom plate in the feed tray, a slot is provided through which the fan-folded original document is fed to the copying machine.

An important object of the present invention is to provide a system which can accurately and truly concurrently feed elongated, fan-folded original documents and elongated copy paper through a reproducing apparatus for the purpose of transferring indicia, by a copying process, from the fan-folded original to the copy paper. Alternatively, the portion of the system in which the fan-folded original documents are located during feeding to the copying machine can be used independently of the copy roll supporting subassembly forming that part of the system by which the copy paper is fed to the copying machine.

A further object of the invention is to provide a system for passing elongated original fan-folded documents through a copying machine, which system includes a document collection tray detachably mounted on the copying machine to receive and automatically stack in a fan-folded configuration the original document after it has passed through the copying machine and is being discharged therefrom.

A further object of the invention is to provide a relatively economical, easily installed and used system by which elongated documents can be fed to a xerographic copy machine at the same time that an elongated copy paper is being fed to the machine.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

Figure 1:
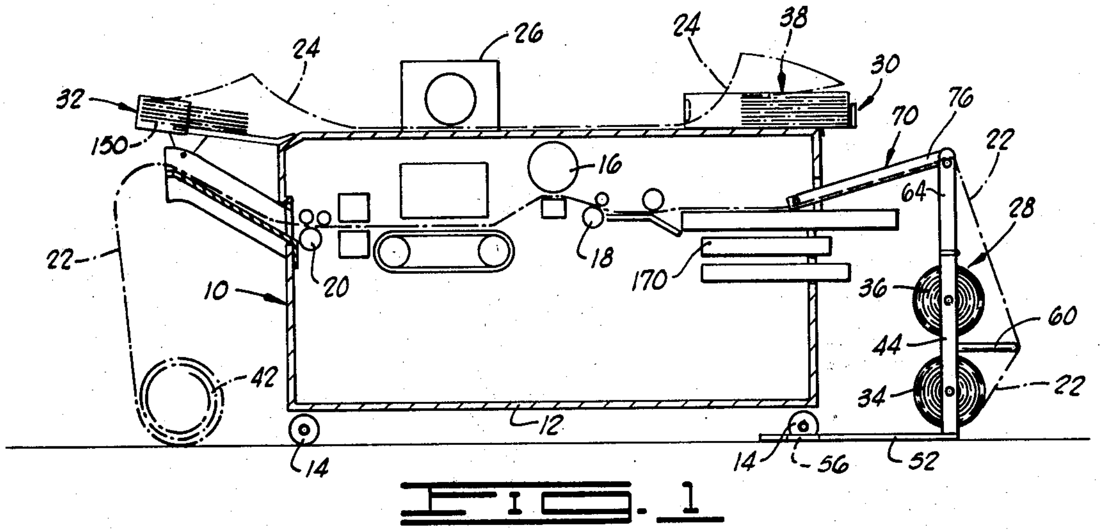
FIG. 1 is a view, partially in side elevation and partially in section, illustrating a preferred embodiment of the system of the invention as it is positioned in relation to, and used in combination with, a xerographic copying machine.

Referring initially to FIG. 1 of the drawings, shown therein is a copying or reproducing machine designated generally by reference numeral 10. The illustrated copying machine is of the xerographic type, and includes a housing 12 mounted upon suitable casters or rollers 14. On the interior of the housing, the copying machine includes a xerographic drum 16, copy paper feed rollers 18 and copy paper discharge rollers 20. The feed rollers 18 and discharge rollers 20 and the equipment associated therewith are conventional in such machines, and are used to pass a copy paper beneath the xerographic drum for purposes of transferring indicia thereto from an original document passed through the copying machine in a manner hereinafter described.

In the drawings under discussion, an elongated, relatively narrow sheet of copy paper is illustrated in dashed lines and is designated by reference numeral 22. An original document to be copied by means of the copying machine 10 is designated by reference numeral 24. It is shown being passed through a feed mechanism 26.

The system for passing elongated papers through the copying machine 10 as constructed in accordance with the present invention includes a copy roll supporting subassembly, designated generally by reference numeral 28, an original document feed tray, designated generally by reference numeral 30, and a document collection tray, designated generally by reference numeral 32.

As illustrated in FIG. 1, the copy roll supporting subassembly 28 is mounted in an upright position adjacent one side of the copying machine 10 and functions to feed the elongated copy paper 22 from a roll 34 constituting one of a plurality of rolls supported on the roll-supporting subassembly. A second or stand-by roll 36 is illustrated as it is concurrently supported on the supporting subassembly 28. As further illustrated in FIG. 1, an original document carrying indicia to be transferred to the copy paper 22 and denominated by referenced numeral 24 originates from a fan-folded stack 38 placed in a particular location within the document feed tray 30 as hereinafter described. Upon completion of the copying process, the original document is discharged from the copying machine 10 and is automatically stacked in a fan-folded configuration in the document collection tray 32. The copy paper 22 being discharged from the copying machine 10 may be collected in roll form as shown at 42 in FIG. 1, or, in the alternative, may be stacked in a fan-fold configuration if it originates from a roll of pre-fan-folded paper of the type described in my co-pending U.S. patent application Ser. No. 104,445 filed on Dec. 17, 1979.

The copy roll supporting subassembly 28 includes a collapsible upright stand made up of a pair of spaced, substantially parallel vertically extending, lower side frame members 44 and 46 which are interconnected at their opposed upper ends by a horizontally extending transverse top frame member 48. At their lower ends, the side frame members 44 and 46 of the upright stand are interconnected by a horizontally extending transverse lower frame member 50. The lower frame member 50 is secured at its outer ends, where it is joined to the side frame members 44 and 46, to a pair of horizontally extending, parallel floor plates 52 and 54. The floor plates 52 and 54 have large slots 56 and 58, respectively, formed therein adjacent the forward ends thereof for the purpose of allowing the rollers 14 at two opposed corners of the copying machine 10 to be placed in these slots, thereby immobilizing and stabilizing the copy roll supporting subassembly 28.

At the midportions of the lower side frame members 44 and 46 of the upright stand, a U-shaped copy paper guide bar 60 has its legs secured to the inner side faces of the lower side frame members 44 and 46 and extends substantially horizontally so that its web portion 60*a* is positioned outwardly from the lower side frame members to guide the copy paper 22 from the roll 34 out and around the upper roll 36 of copy paper and to a position at the upper side of the upright stand for a purpose hereinafter described.

The upright stand further includes a pivotable upper section formed by a horizontal, transversely extending lower frame plate 62 which is hingedly connected, and extends parallel, to the top frame member 48, and a pair of parallel, vertically extending upper side frame members 64 and 66 which are disposed in coplanar alignment with the lower side frame members 44 and 46. The upper section of the upright stand further includes a horizontally extending, transverse support rod 68 which extends between, and is supported by, the side frame members 64 and 66.

Figure 2:
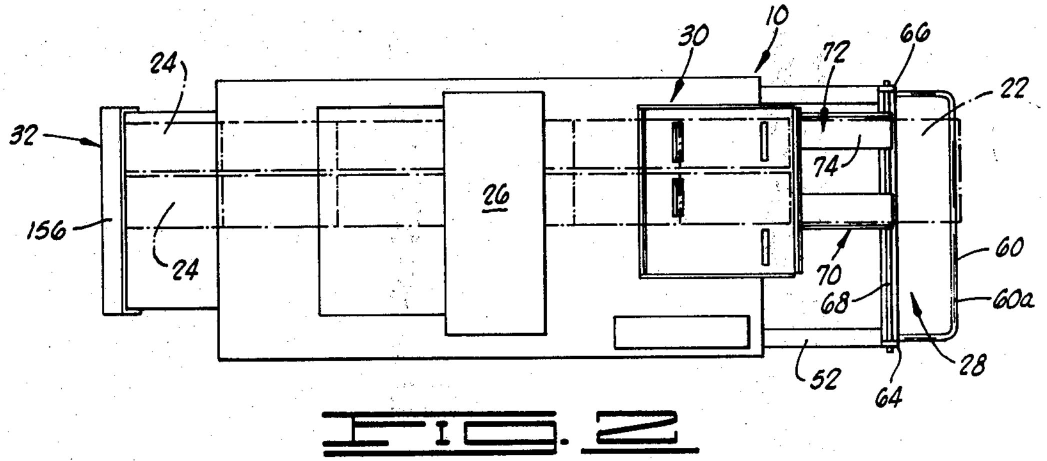
FIG. 2 is a plan view of the system and copying machine depicted in FIG. 1. Paper being passed through the copying machine is illustrated in dashed lines.
Figure 3:
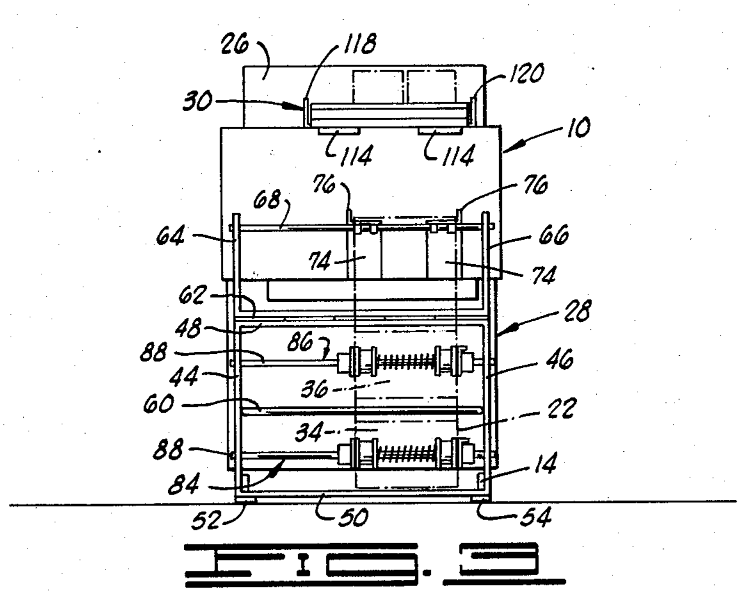
FIG. 3 is an end elevation view of a portion of the system of the present invention positioned adjacent a copying machine and illustrating, in dashed lines, copy paper and fan-folded original documents as they are being fed to the copying machine.
Figure 4:
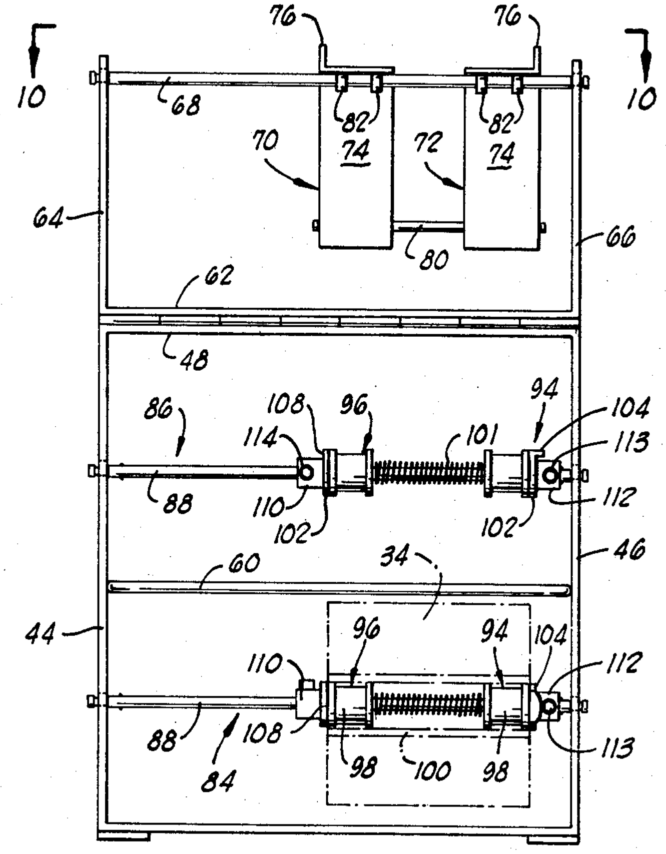
FIG. 4 is a side elevation view of a copy roll supporting subassembly and illustrating in dashed lines a copy roll as it is supported in this subassembly.
Figure 5:
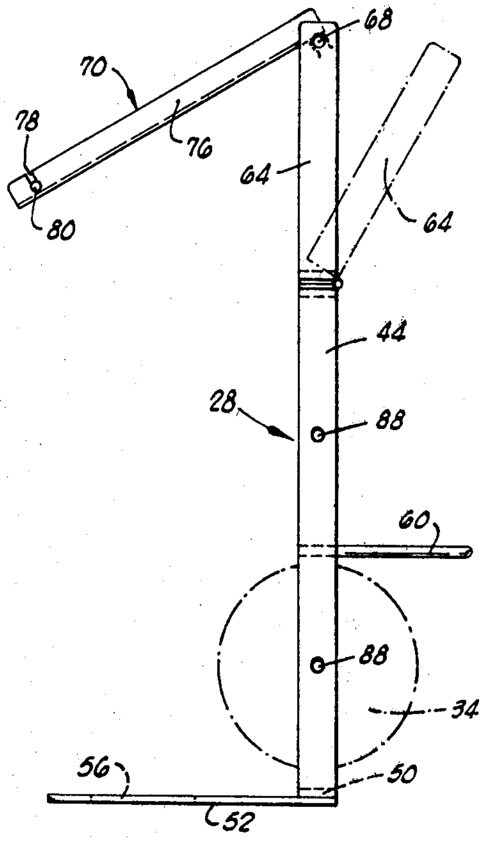
FIG. 5 is a side elevation view of the copy roll supporting subassembly illustrated in FIG. 4, and showing in dashed lines a roll of copy paper supported on the subassembly, and further showing in dashed lines an alternative position of a part of the subassembly as it is being folded to a compact storage position.
Figure 10:
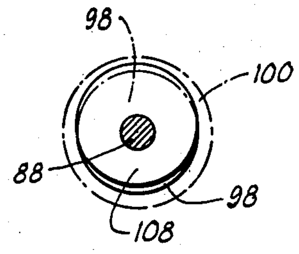
FIG. 10 is a sectional view taken along line 10—10 of FIG. 6.
Figure 16:
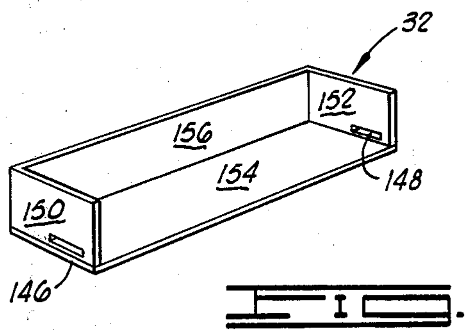
FIG. 16 is a perspective view of the collection tray which is detachably connectable to the copying machine for the purpose of catching and deflecting into a fan-folded stack, fan-folded original documents after they have passed through the copying machine.
Figure 11:
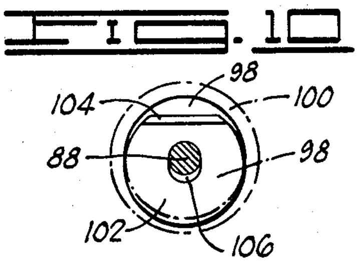
FIG. 11 is a sectional view taken along line 11—11 of FIG. 6.

A pair of paper guide elements denominated generally by reference numerals 70 and 72 are detachably and pivotally connected to the support rod 68, and are adjustably and selectively spaced horizontally from each other. The paper guide elements 70 and 72 each include a paper support plate 74 and a vertically extending guide flange 76 which projects normal to the respective support plate at a side edge thereof (see FIGS. 2 and 10). Each of the guide flanges 76 on the two paper guide elements 70 and 72 is provided with a downwardly extending slot 78 formed therein near the end of the respective guide flange which is opposite the end of the respective paper guide element detachably connected to the rod 68. A hold-down rod 80 is laid in the slots 78 and rests upon copy paper being passed through the guide elements 70 and 72 in a manner hereinafter described. Each of the guide elements 70 and 72 is attached to the rod 68 by means of a pair of spring clips 82 secured to the underside of the respective plates 74 and frictionally gripping the rod 68 by spring tension. It will be noted from the described construction of the paper guide elements 70 and 72 that they can be moved toward or away from each other along their respective points of engagement with the rod 68 so that different widths of copy paper can be accommodated between the guide flanges 76 thereof as may be required.

Figure 6:
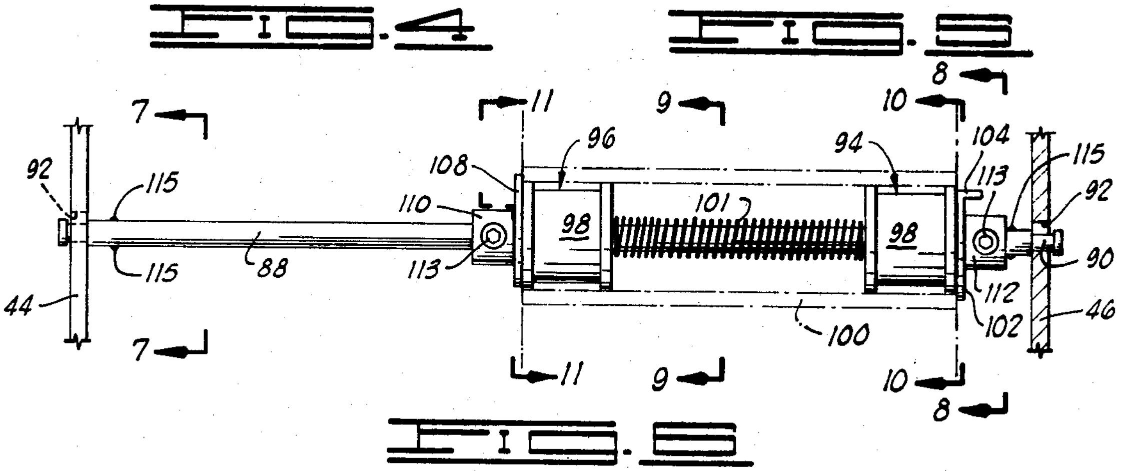
FIG. 6 is a detail view illustrated in elevation one of the two copy roll supporting elements employed as a part of the copy roll supporting subassembly. A portion of the copy roll supportable thereon is illustrated in dashed lines.
Figure 7:
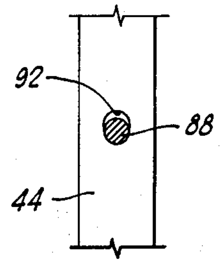
FIG. 7 is a sectional view taken along line 7—7 of FIG. 6.
Figure 8:
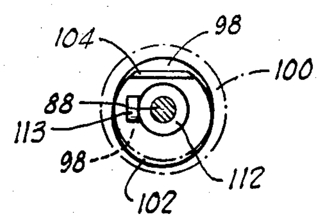
FIG. 8 is a sectional view taken along line 8—8 of FIG. 6.
Figure 9:
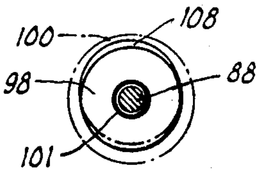
FIG. 9 is a sectional view taken along line 9—9 of FIG. 6.
Figure 12:
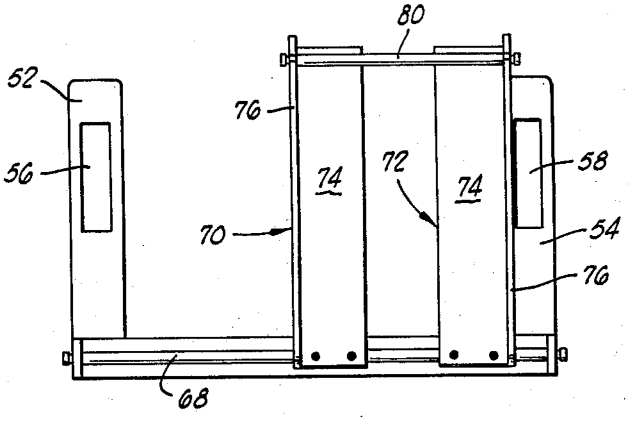
FIG. 12 is a plan view of the copy roll supporting subassembly forming a part of the system of the invention.

Also included in the roll supporting subassembly 28 are a pair of roll supporting elements designated generally by reference numerals 84 and 86. The roll supporting elements 84 and 86 are identical, and each includes an elongated cylindrical bar 88 having a pair of circumferential grooves 90 in the opposite end portions thereof (see FIG. 6). The grooves 90 permit the respective bars 88 of the roll supporting elements 84 and 86 to be received in openings 92 formed in the opposed parallel lower side plates 44 and 46. The bars 88 are thus able to rotate about their longitudinal axes as a consequence of the bearing surface formed between the grooves 90 and the lower side of the respective circular openings 92 into which the ends of the bars 88 are placed.

Slidably mounted on each of the bars 88 within the respective roll supporting elements 84 and 86 are a pair of roll supporting hub elements designated generally by reference numerals 94 and 96. Each of the roll supporting hub elements 94 and 96 includes a generally cylindrical core insert block 98. Each core insert block 98 is dimensioned to permit the outer periphery thereof to frictionally engage the inner surface of a cardboard core 100 conventionally located at the center of a copy paper roll, and functioning as a support for the concentric convolutions of copy paper wound thereupon. Each of the core insert blocks 98 is slidably mounted on the respective bar 88 for axial movement therealong. A helical spring 101 extends around the bar 88 between the core insert blocks 98.

Flatly abutting the relatively large end or base of one of the core insert blocks 98 forming a part of the roll supporting hub element 94 is a roll stop plate 102. The roll stop plate 102 has a circular outer periphery, and a finger flange 104 which projects normal to the major plane of the stop plate and in a direction away from the core insert block 98. The roll stop plate 102 is provided at its center with an elliptical slot 106. The diameter of the roll stop plate 102 is slightly smaller than the inside diameter of the cardboard core 100, and this roll stop plate is used for a purpose and in a manner hereinafter described.

Bearing flatly against the core insert block 98 of the roll supporting hub element 96 of each of the roll supporting elements 84 and 86 is a second roll stop plate 108. The second roll stop plate 108 is disc-shaped with a circular outer periphery, and differs from the roll stop plate 102 in that it does not include a finger flange 104 and has a small circular opening radially offset from the center thereof which is sized to closely accommodate the elongated cylindrical bar 88 passed therethrough. The diameter of the roll stop plate 108 is slightly larger than the diameter of the cardboard core 100, and one side edge thereof projects past the periphery of the core 100 due to the offset of the circular opening which receives the bar 88.

Slidably mounted on each of the elongated cylindrical bars 88 forming a part of each of the roll supporting elements 84 and 86 are a pair of adjustable stop elements 110 and 112. Each of the adjustable stop elements 110 and 112 is in the form of a cylindrical block having a central bore to slidingly accommodate the respective elongated cylindrical bar 88. Each stop element 110 and 112 further has a threaded radial opening drilled therethrough to accommodate a set screw 114 which is used to fix the position of the respective stop element at a selected location along the elongated cylindrical bar 88.

In the use of each of the roll supporting elements 84 and 86, a roll of copy paper constituted by concentric convolutions of elongated copy paper wound upon a centrally disposed hollow cardboard core 100 of cylindrical configuration is mounted on each of the roll supporting elements. To place the copy paper rolls 34 and 36 in operative position on the respective roll supporting elements 84 and 86, the respective elongated cylindrical bar 88 is first removed from its supported position in the openings 92 provided in the lower side frame elements 44 and 46 so that opposite ends of the bar 88 are exposed. The roll stop plate 102 can then be manipulated by means of the finger flange 104 so that it is precisely centered on the bar 88. In this centered position, it is in contact with the end face of the core insert block 98, and the stop element 112 also bears against it to hold it in the centered position.

It will be recalled that the roll stop plate 102 is slightly smaller in diameter than the inside diameter of the cardboard core 100 of the copy paper roll. Thus, when the roll stop plate 102 is centered on the bar 88, the copy paper roll can be passed over the roll stop plate 102 and the core insert block 98 and brought to bear against the second roll stop plate 108. At this time, the outer peripheries of the core insert blocks 98 bear against the inside surface of the hollow cylindrical cardboard core 100, and one end of this core is abutted against the second roll stop plate 108 which forms a part of the roll supporting hub element 96.

When the core is so positioned, the elliptical slot 106 at the center of the roll stop plate 102 permits this roll stop plate to be moved radially outwardly to a position at which its circular outer periphery is eccentric with respect to the longitudinal axis of the bar 88. The roll stop plate 102, after being moved to this position by the use of the finger flange 104, is now in a blocking position to block movement of the hollow cylindrical cardboard core 100 to the right as this element is viewed in FIG. 6. The cardboard core 100 is now precisely centered between the first roll stop plate 102 and the second roll stop plate 108 and cannot pass by these elements. The roll of copy paper is thus retained against axial movement along the bar 88, and is also supported upon the outer peripheries of the core blocks 98 of the respective roll supporting hub elements 94 and 96.

In order to prevent inadvertent loss of the stop elements 110 and 112, of the roll stop plates 102 and 108 and of the core insert blocks 98 of each of the roll supporting elements 84 and 86, each of the elongated bars 88 includes a pair of radial protuberances 115 adjacent each of its ends (inside the circumferential grooves 90) so that the respective stop elements 110 and 112 cannot pass the ends of the respective bars 88 and be removed.

When the copy roll supporting subassembly 28 is in its full usage mode, it carries and supports an active copy paper roll and a stand-by or extra copy paper roll. When the copy paper roll 34 is used to feed copy paper to the copying machine 10, the copy paper 22 is extended over the guide bar 60 and up to the top side of the upright stand of the copy roll supporting subassembly. From this point, the copy paper 22 is led between the paper guide elements 70 and 72 with its opposite edges being limited against lateral shifting by the guide flanges 76 carried by each of the paper guide elements 70 and 72. The copy paper 22 is supported as it moves between the paper guide elements 70 and 72 by the paper support plates 74 forming a part of each of these elements. Further, it is retained against buckling by the hold-down rod 80 at the outer ends of each of the paper guide elements 70 and 72. After passing beneath the hold-down rod 80, the copy paper 22 is drawn into the copying machine by the feed rollers 18 preparatory to passing the copy paper under the xerographic drum 16 in a conventional manner.

If desired, copy paper 22 can be drawn from the roll 36 instead of from the copy paper roll 34. In this event, the copy paper 22 is fed directly from the outer periphery of the copy paper roll 36 into the channel formed between the paper guide elements 70 and 72, under the hold-down rod 80 and into the copying machine 10. Either copy paper roll may be used at any time.

Before terminating discussion of the copy roll supporting subassembly 28, it is pointed out that the subassembly can be folded down into a compact form by folding the upper side frame members 64 and 66 downwardly about the hinge which interconnects the lower frame plate 62 to the top frame member 48 until the upper side frame members 64 and 66 rest against, and extend parallel to, the lower side frame members 44 and 46. It will also be noted that the two paper guide elements 72 and 74 can be detached from the support rod 68 by simply lifting them up to disengage the spring clips 82 from the support rod. Last, each of the roll supporting elements 84 and 86 can be removed from the upright stand by simply lifting the respective elongated cylindrical bars 88 in each of these roll supporting elements upwardly slightly so that its opposite ends can be disengaged from the openings 92 formed in the lower side frame members 44 and 46. The entire copy roll supporting subassembly 28 can thus be dismantled and folded into a collapsed position so that it can be easily transported or stored.

The ability to fold down the upper side frame members 64 and 66 also facilitates ease of access to the stored paper trays 170 which are stored in the copying machine at the location shown in FIG. 1.

Figure 13:
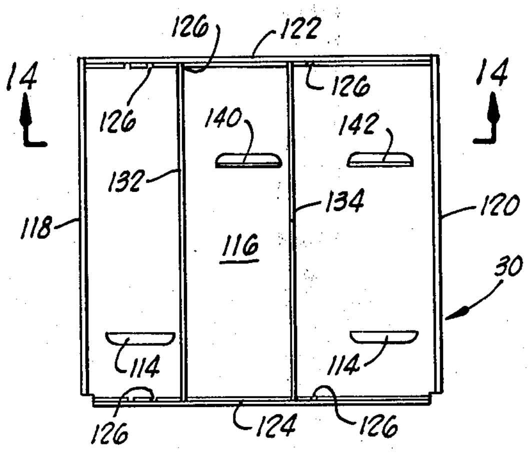
FIG. 13 is a plan view of the document feed tray forming a part of the system of the invention.
Figure 15:
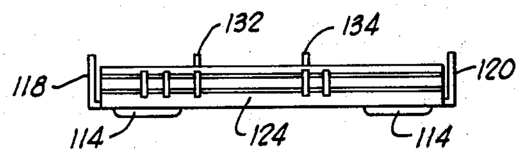
FIG. 15 is an end elevation view of the document feed tray shown in FIG. 13.

The document feed tray 30 is utilized for containing and feeding one or more fan-folded original documents from which the indicia carried thereon are to be transferred to, and reproduced on, the copy paper 22. The feed tray 30 is supported on the copying machine 10 at the upper side of the machine as illustrated in FIG. 1. The feed tray 30 includes a pair of ribs or detents 114 which project downwardly from the bottom plate 116 of the feed tray as shown in FIG. 13. The ribs 114 are preferably formed by cutting through the bottom plate 116 and striking out or bending downwardly a pair of metal flanges to form the ribs. The ribs 114 hook over and bear against the side wall of the copying machine 10 as shown in FIG. 1 so that the bottom plate 116 of the feed tray 30 can rest flatly upon the upper side of the copying machine. The feed tray 30 further includes a pair of vertically extending side walls 118 and 120 which extend normal to the bottom plate 116, a front wall 122 and a back wall 124. The front wall 122 and the back wall 124 are each provided with a plurality of vertical slots 126 which are spaced along the front and back walls and facilitate selective positioning of two or more partition plates 132 and 134 which have their opposed end edges placed in selected slots in the front and back wall so as to form bins or chambers with each other and with the side walls 118 and 120.

Figure 14:
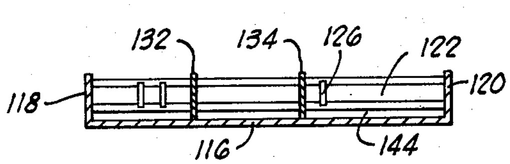
FIG. 14 is a sectional view taken along line 14—14 of FIG. 13.

The slots 126, in permitting selective adjustment of the location and spacing from each other of the partition plates 132 and 134, thus permit adjustment of the sides of a plurality of bins used to hold multiple stacks 38 of fan-folded original documents 24. The stacks of fan-folded original documents are each positioned in one of these bins in the feed tray 30 so that the aligned edges at the fold lines in the documents bear against upwardly projecting protuberances or ribs 140 and 142. The ribs 140 and 142 project upwardly from the bottom plate 116 and can be formed by cutting through the bottom plate and pressing out a lip or flange in the manner hereinbefore described. As the fan-folded documents 24 are fed from their respective stacks 38 supported on the bottom plate 116 of the feed tray 30, the respective document is passed through a slot 144 formed between the forward wall 122 and the bottom plate 116 as shown in FIG. 14.

After passing through the slot 144, the original documents are passed through the imaging housing 26 and are discharged therefrom on the opposite side of the copying machine 10. The discharging original documents 24 pass over one end of the copying machine and enter a document collection tray 32. The document collection tray 32 is detachably mounted on the copying machine 10 by lug-receiving slots 146 and 148 formed in opposed side walls 150 and 152, respectively, of the collection tray. The collection tray 32 also includes a bottom plate 154 against which the leading edge of the discharging original documents can slide, and a deflection end plate 156. The documents impinging upon the deflection end plate 156 are deflected into a fan-fold configuration, and are automatically stacked in such fan-fold configuration as illustrated in FIG. 1.

The system described permits at least two original fan-folded documents to be fed simultaneously and in synchronism from the feed tray 30 through the imaging housing 26 of the copying machine 10 and to be ultimately concurrently automatically fan-folded into stacks by the deflecting action of the document collection tray 32. Concurrently with the feeding of the pair of fan-folded original documents from the feed tray 30, copy paper 22 from one of the copy paper rolls 34 or 36 is fed to the copying machine. The copy paper 22 will usually be of sufficient width that reproduction of the indicia carried on all of the fan-folded original documents being concurrently fed from the feed tray can be placed upon the relatively wide copy paper. Separation of the indicia traces can later be developed by longitudinal severance of the copy paper, if such should be desirable. It will be noted that the ability to shift the partitioning plates 132 and 134 in their transverse locations within the feed tray 30 will facilitate containment of fan-folded documents of varying transverse widths into two chambers formed by the two partition plates and the side wall 120. Thus, well logs, for example, which vary in their sizes, can be accommodated in the feed tray regardless of the particular size of log which is to be copied.

From the foregoing description of a preferred embodiment of the invention, it will be appreciated that various changes in the particular structures illustrated in the drawings and constituting preferred arrangements of structure useful in the invention can be effected without departure from the basic principles upon which the invention is bottomed. Changes and innovations of this type are therefore deemed to be circumscribed by the spirit and scope of the invention except as the same may be necessarily limited by the appended claims or reasonable equivalents thereof.

What is claimed is:

1. A system for passing long, fan-folded documents and copy paper through a reproducing apparatus comprising:

a collapsible, upright stand including:
- a pair of opposed, parallel, vertically extending lower side frame members;
- a plurality of roll supporting elements in said lower side frame members;
- a pair of horizontally extending floor plates connected to, and extending from, said lower side frame members;
- a pair of opposed, parallel, vertically extending upper side frame members hingedly connected to said lower side frame members for pivotation from a position above, and in coplanar alignment with, said lower side frame members to a position alongside of, and parallel to, said lower side frame members;
- paper guide means above said upper side frame members; and
- a support rod extending between said upper side frame members and detachably connected to, and supporting, said paper guide means;

a reproducing apparatus adjacent said upright stand and having said paper guide means extending into contact therewith;

a document feed tray engaged with the upper side of said reproducing apparatus for feeding thereto an elongated document to be copied; and a document collection tray engaged with the upper side of said reproducing apparatus at a location horizontally spaced from said feed tray for receiving a copied document from said reproducing apparatus.

2. A system for passing long, fan-folded documents and copy paper through a reproducing apparatus comprising:

a collapsible, upright stand having:
- a plurality of roll supporting elements; and
- paper guide means above said roll supporting elements, said paper guide means comprising:
  - a pair of spaced paper guide elements each including:
    - a paper support plate; and
    - a guide flange projecting normal to the paper support plate along one edge thereof;

a reproducing apparatus adjacent said upright stand and having said paper guide means extending into contact therewith;

a document feed tray engaged with the upper side of said reproducing apparatus for feeding thereto an elongated document to be copied; and a document collection tray engaged with the upper side of said reproducing apparatus at a location horizontally spaced from said feed tray for receiving a copied document from said reproducing apparatus.

3. A system for passing long, fan-folded documents and copy paper through a reproducing apparatus comprising:

a collapsible, upright stand having;
- a plurality of roll supporting elements; and
- paper guide means above said roll supporting elements;

a reproducing apparatus adjacent said upright stand and having said paper guide means extending into contact therewith;

a document feed tray engaged with the upper side of said reproducing apparatus for feeding thereto an elongated document to be copied, said feed tray comprising:
- a bottom plate;
- first rib means projecting downwardly from the bottom plate and engaging the reproducing apparatus;
- a pair of spaced side walls projecting from opposed edges of the bottom plate and normal thereto;
- a front wall extending between the side walls and defining a slot with the bottom plate to facilitate extension of an elongated document therethrough; and second rib means projecting upwardly from the bottom plate and extending parallel to said slot for retaining a folded document stack in said feed tray; and a document collection tray engaged with the upper side of said reproducing apparatus at a location horizontally spaced from said feed tray for receiving a copied document from said reproducing apparatus.

4. A system for passing long, fan-folded documents and copy paper through a reproducing apparatus comprising:

a collapsible, upright stand having:

a plurality of roll supporting elements; and paper guide means above said roll supporting elements;

a reproducing apparatus adjacent said upright stand and having said paper guide means extending into contact therewith;

a document feed tray engaged with the upper side of said reproducing apparatus for feeding thereto an elongated document to be copied; and a document collection tray engaged with the upper side of said reproducing apparatus at a location horizontally spaced from said feed tray for receiving a copied document from said reproducing apparatus, said document collection tray comprising:

a pair of opposed, parallel side walls having slots therein facilitating detachable connection of the collection tray to said reproducing apparatus;

a bottom plate extending between the side walls; and a deflection end plate extending between the side walls and the bottom plate.

5. A system for passing long, fan-folded documents and copy paper through a reproducing apparatus comprising:

a collapsible, upright stand having:

a plurality of roll supporting elements, each of said roll supporting elements comprising:

an elongated bar; and a pair of spaced, opposed roll supporting hub elements on said bar, and each including:

a core insert block slidably mounted on said bar;

a roll stop plate slidably mounted on said bar adjacent said insert block; and a stop element on the opposite side of said roll stop plate from said core insert block; and paper guide means above said roll supporting elements;

a reproducing apparatus adjacent said upright stand and having said paper guide means extending into contact therewith;

a document feed tray engaged with the upper side of said reproducing apparatus for feeding thereto an elongated document to be copied; and a document collection tray engaged with the upper side of said reproducing apparatus at a location horizontally spaced from said feed tray for receiving a copied document from said reproducing apparatus.

6. A system for passing long, fan-folded documents and copy paper through a reproducing apparatus comprising:

a collapsible, upright stand having:

a pair of opposed, parallel, vertically extending lower side frame members;

a plurality of roll supporting elements detachably carried in said lower side frame members in vertically spaced relation to each other;

a U-shaped guide bar having its opposite ends secured to said lower side frame members and positioned between said roll supporting elements; and paper guide means above said roll supporting elements;

a reproducing apparatus adjacent said upright stand and having said paper guide means extending into contact therewith;

a document feed tray engaged with the upper side of said reproducing apparatus for feeding thereto an elongated document to be copied; and a document collection tray engaged with the upper side of said reproducing apparatus at a location horizontally spaced from said feed tray for receiving a copied document from said reproducing apparatus.

7. A system as defined in claim 2 wherein said paper guide means further comprises:

a spring clip projecting from each of said paper support plates and detachably retaining the paper guide elements on said upright stand; and a hold down rod extending between said guide flanges and across, and parallel to, said paper support plates.

8. A system as defined in claim 3 wherein said document feed tray is further characterized as including:

a back wall extending substantially parallel to said front wall;

means on said front and back walls facilitating selective engagement with at least one partition plate at a selected spacing from said side walls and parallel thereto; and at least one partition plate detachably engaging said means on said front and back walls.

9. A system as defined in claim 5 wherein one of said roll stop plates has a circular outer periphery and is further characterized in having a circular hole therethrough at a position radially offset from the center thereof and dimensioned to receive said elongated bar, and wherein the other of said roll stop plates has a circular outer periphery of a diameter no larger than the largest dimension of said core insert blocks, and is further characterized as including an elongated slot at the center thereof facilitating eccentric mounting of said other roll stop plate on said elongated bar.

10. A system as defined in claim 1 wherein said paper guide means comprises:

a pair of spaced paper guide elements each including:

an elongated paper support plate having an upper side and a lower side;

a spring clip secured to the lower side of the paper support plate and detachably and slidably engaging said support rod; and a guide flange projecting normal to the paper support plate along one edge thereof and projecting from the upper side of said paper support plate; and a hold-down rod extending between said guide flanges and across, and parallel to, said paper support plates.

11. A system as defined in claim 1 wherein said document feed tray comprises:

a bottom plate;

means projecting downwardly from the bottom plate and adapted for engagement with the reproducing apparatus;

a pair of spaced, substantially parallel side walls projecting from the opposite side of the bottom plate from said downwardly projecting engaging means and extending normal to the bottom plate;

a front wall extending between the side walls and defining a slot with the bottom plate to facilitate extension of an elongated document therethrough; and rib means projecting upwardly from the bottom plate and extending parallel to said slot for retaining a folded document stack in said feed tray.

12. A system as defined in claim 1 wherein said document collection tray comprises:

a pair of opposed, parallel side walls having slots therein facilitating detachable connection of the collection tray to said reproducing apparatus;

a bottom plate extending between the side walls; and a deflection plate extending between the side walls normal to the bottom plate for deflecting pre-fan-folded documents moving into said deflection plate into a fan-folded stack.

13. A system as defined in claim 1 wherein each of said roll supporting elements comprises:

an elongated bar extending between said lower side frame members; and a pair of spaced, opposed, roll supporting hub elements on said bar, each of said roll supporting hub elements including:

a core insert block slidably mounted on said bar;

a roll stop plate surrounding said bar and slidably mounted on the bar adjacent said insert block; and a stop element on the opposite side of said roll stop plate from said core insert block and surrounding said elongated bar; and means for locking said stop element to said elongated bar against axial movement of the stop element along the bar.

14. A system as defined in claim 13 wherein said document feed tray comprises:

a bottom plate;

first rib means projecting downwardly from the bottom plate and engaging the reproducing apparatus;

a pair of spaced side walls projecting from opposed edges of the bottom plate and normal thereto;

a front wall extending between the side walls and defining a slot with the bottom plate to facilitate extension of an elongated document therethrough; and second rib means projecting upwardly from the bottom plate and extending parallel to said slot for retaining a folded document stack in said feed tray.

15. A system as defined in claim 14 wherein said document collection tray comprises:

a pair of opposed, parallel side walls having slots therein facilitating detachable connection of the collection tray to said reproducing apparatus;

a bottom plate extending between the side walls; and a deflection end plate extending between the side walls and normal to the bottom plate.

16. A system for xerographically transferring indicia from an original document to an elongated copy paper comprising:

a copy roll supporting subassembly for supporting at least one roll of copy paper and including:

a pair of opposed, vertically extending, substantially parallel, lower side frame members;

a pair of floor plates projecting horizontally from said lower frame members;

upper frame means pivotally connected to the upper ends of said lower side frame members for pivotation about a horizontal axis to fold said copy roll supporting subassembly into a compact status and including:

a horizontally extending support rod;

a pair of paper guide elements detachably connected to said support rod for sliding axial movement therealong, and for pivotation thereof about a horizontal axis; and a roll supporting element including:

an elongated bar extending substantially horizontally and having its opposite ends detachably supported in said lower side frame members; and a pair of spaced roll supporting hub elements slidably mounted on said bar for axial sliding movement therealong;

a cylindrical core around said bar and engaged by said spaced roll supporting hub elements;

a xerographic reproducing machine resting upon said floor plates and having a side adjacent said lower side frame members and said upper frame means;

a portion supporting said paper guide elements;

a xerographic drum; and a roll of copy paper concentrically coiled around said core and including a web extending along said paper guide elements and through said xerographic reproducing machine adjacent said xerographic drum.

17. A system as defined in claim 16 wherein said upper frame means is further characterized in including:

a pair of upper side frame members extending upwardly from said lower side frame members and having said support rod extending between the upper ends thereof; and a lower frame plate extending horizontally between the lower ends of said upper side frame members and hingedly connected to the upper ends of said lower side frame members for pivotation about a horizontal axis.

18. A system as defined in claim 17 wherein each of said roll supporting hub elements comprises:

a tapered core insert block of cylindrical overall configuration positioned around said elongated bar;

a stop element slidingly surrounding said elongated bar; and a set screw threaded into said stop element for engagement with said elongated bar;

19. A system as defined in claim 16 wherein each of said paper guide elements includes:

a paper support plate; and spring clip means engaging said support rod.

20. A system as defined in claim 16 and further characterized as including:

an additional roll supporting element identical in construction to said first roll supporting element and spaced vertically therefrom in said lower side frame members; and a guide bar connected to said lower side frame members at a location between said roll supporting elements.

21. A system as defined in claim 20 wherein each of said guide elements includes:
a paper support plate; and
spring clip means engaging said support rod.

22. A system as defined in claim 21 and further characterized as including paper hold-down means associated with said paper support plates for holding a web of paper against said paper support plates as such web travels across said paper support plates.

23. Apparatus for supporting a roll of copy paper and guiding paper therefrom to a point of introduction into a copying machine comprising:
a collapsible upright stand which includes:
a pair of opposed, parallel, vertically extending lower side frame members;
a horizontally extending lower frame member interconnecting the lower side frame members at their lower ends;
a top frame member interconnecting the lower side frame members at their upper ends;
a first horizontal roll supporting element extending between said lower side frame members;
floor plate means projecting horizontally from said lower frame member and connected thereto;
upper frame means pivotally connected to, and extending vertically from, said lower side frame members and including a horizontally extending support rod at the upper side thereof; and
paper guide means pivotally connected to said support rod for pivotation about a horizontal axis.

24. Apparatus as defined in claim 23 and further characterized as including:
a second horizontal roll supporting element extending between said lower side frame members and spaced above said first roll supporting element; and
a guide bar positioned between said first and second roll supporting elements and secured to said lower side frame members for guiding paper from a roll on said first roll supporting element around said second roll supporting element to said paper guide means.

25. Apparatus as defined in claim 23 wherein said floor plate means comprises a pair of elongated, horizontally extending, horizontally spaced floor plates each having an end connected to said lower frame member, and each having a slot therein to facilitate engagement with casters on a copying machine.

26. Apparatus as defined in claim 23 wherein said upper frame means comprises:
a pair of opposed, parallel, vertically extending upper side frame members having their upper ends secured to said horizontally extending support rod; and
a lower frame plate secured to the lower ends of said upper side frame members and hingedly connected to said top frame member to facilitate pivotation of said upper side frame members from an operative position in coplanar alignment with said lower side frame members to a position alongside and parallel to said lower side frame members.

27. Apparatus as defined in claim 23 wherein said paper guide means comprises a pair of horizontally spaced, substantially parallel paper guide elements, each of said paper guide elements comprising:
a paper support plate for supporting a web of paper passed thereover; and
a paper guide flange projecting from said paper support plate for guiding an edge of a web of paper supported by and passed over said paper support plate.

28. An upright stand for supporting a roll of elongated copy paper to be fed to a copying machine comprising:
vertically extending side frame means;
a pair of opposed, substantially parallel paper guide elements pivotally connected to the upper end of said side frame means for pivotation about a horizontal axis;
floor plate means projecting horizontally from, and connected to, the lower end of said side frame means;
a plurality of roll supporting elements detachably mounted in said side frame means, each of said roll supporting elements comprising:
an elongated bar; and
a pair of roll supporting hub elements slidably mounted on said elongated bar and each including:
a core insert block surrounding the elongated bar;
a roll stop plate adjacent said core insert block and surrounding said elongated bar; and
a stop element around said elongated bar and positioned on the opposite side of said stop plate from said core insert block; and
a guide bar connected to said frame means between the upper and lower ends thereof for guiding paper from a roll on one of said roll supporting elements to said paper guide elements.

29. An upright stand as defined in claim 28 and further characterized in that each of said paper guide elements defines a slot, and wherein said stand further includes an elongated hold-down rod resting in said slots.

30. An upright stand as defined in claim 28 and further characterized as including a helical spring around each of said elongated bars and positioned between the pair of roll supporting hub elements carried thereon.

31. An upright stand as defined in claim 28 wherein said floor plate means includes slot means engageable with casters on a copying machine.

32. An upright stand as defined in claim 28 wherein each of said core insert blocks is of cylindrical configuration.

33. An upright stand as defined in claim 28 wherein each of said paper guide elements comprises:
an elongated paper support plate;
a guide flange secured to one edge of the paper support plate and projecting normal thereto to impart an L-shaped cross-sectional configuration to said paper guide element; and
means secured to one end of said support plate for detachably connecting said support plate and guide flange to said side frame means for horizontal sliding movement thereon and for pivotation of said support plate and guide flange about a horizontal axis.

34. A document feed tray for feeding elongated fan-folded documents to be copied to a copying machine comprising:
a bottom plate;
first rib means projecting from one side of said bottom plate;

a pair of opposed, spaced side walls connected to the opposite side edges of said bottom plate and projecting normal to said bottom plate on the opposite side of the bottom plate from said first rib means;

a front wall extending between the side walls at one end thereof and defining a paper passage slot with said bottom plate;

a rear wall spaced from said front wall and interconnecting said side walls, said rear wall extending substantially normal to said bottom plate; and second rib means projecting from said bottom plate on the opposite side thereof from said first rib means and extending substantially parallel to said front and rear walls at a location therebetween.

35. A document feed tray as defined in claim 34 and further characterized as including:

at least one partition plate extending across said feed tray over said bottom plate parallel to said pair of opposed, spaced side walls and between said front and rear walls; and means detachably engaging said partition plate with said front and rear walls at a selected but variable distance from said side walls.

36. A document feed tray as defined in claim 34 wherein said first and second rib means are flanges cut and bent from said bottom plate in opposite directions.

37. A document collection tray adapted for detachable connection to a xerographic reproducing apparatus comprising:

a pair of opposed, parallel side walls having lug receiving slots therein for detachably mounting said tray on a reproducing apparatus;

a bottom plate extending between, and normal to, said side walls; and a deflection end plate extending between the side walls and extending normal to the side walls and said bottom plate.

38. Apparatus for supporting rolls of paper for feeding paper to a machine utilizing the paper comprising:

lower frame means;

a pair of vertically spaced, horizontally extending, roll supporting elements mounted in said lower frame means;

a paper guide bar mounted on said lower frame means for guiding paper around a paper roll supported on the uppermost of said horizontally extending roll supporting elements;

floor plate means secured to the lower end of said lower frame means; and upper frame means pivotally connected to, and extending vertically from, said lower frame means, said upper frame means being foldable from an operative position in coplanar alignment with said lower frame means to an inoperative position alongside of, and substantially parallel to, said lower frame means, said upper frame means including a horizontally extending support rod at the upper side thereof.

39. A paper guiding apparatus for guiding a linearly moving elongated web of paper comprising:

horizontally extending support rod means;

a pair of spaced, opposed, substantially parallel paper guide elements;

spring clamp means slidably and detachably supporting said parallel paper guide elements on said support rod means;

each of said paper guide elements comprising:

an elongated paper support plate; and a guide flange secured to one edge of the paper support plate; and a paper hold-down rod resting in slots in said guide flanges and extending across said paper guide elements over said paper support plates.

40. A document feed tray for feeding elongated original fan-folded documents to be copied to a copying machine from a fan-fold stack comprising:

a bottom plate having an upper side and a lower side, a pair of opposed, substantially parallel side edges, a front edge and a back edge;

first positioning means projecting from the lower side of said bottom plate and adapted to mount and index said document feed tray on a copying machine preparatory to feeding documents thereto from said feed tray;

a pair of opposed, substantially parallel spaced side walls connected to the opposite side edges of said bottom plate and projecting substantially normal to said bottom plate and projecting upwardly from the upper side of said bottom plate;

at least one partition plate extending across a major portion of said feed tray over said bottom plate parallel to said pair of opposed, spaced side walls from the upper side of said bottom plate;

means detachably mounting said partition plate at a variably selectable location on the upper side of said bottom plate whereby said partition plate and side walls define two variable width paper bins; and second positioning means projecting from the upper side of said bottom plate at a location spaced from said front edge toward said back edge and adapted to abut the vertically aligned edges of a stack of fan-folded paper positioned in said feed tray as said fan-folded paper is fed from said feed tray to said copying machine.

41. A system for xerographically copying indicia onto roll-fed copy paper from an elongated original fan-folded document comprising:

a xerographic reproducing apparatus including a xerographic drum;

a collapsible, upright stand having:

a pair of opposed, parallel vertically extending side frame members positioned adjacent said xerographic reproducing apparatus; and horizontally extending floor plate means connected to, and extending from, said side frame members to a position beneath said xerographic reproducing apparatus for engagement thereby to retain said collapsible, upright stand in its operative position adjacent and in alignment with said xerographic reproducing apparatus;

means carried on said side frame members for detachably supporting a roll of copy paper in a position adjacent said reproducing apparatus for feeding copy paper from said roll to said reproducing apparatus;

an elongated bar extending substantially horizontally and having its opposite ends detachably supported in said supporting means;

a cylindrical core around said bar;

a roll of copy paper concentrically coiled around said core and including a web extending through said xerographic reproducing apparatus adjacent said xerographic drum; and a document feed tray engaged with the upper side of said reproducing apparatus for feeding thereto an elongated fan-folded document to be copied.

* * * * *